(12) United States Patent  (10) Patent No.: US 10,531,076 B2
Wei                        (45) Date of Patent:     Jan. 7, 2020

(54) DEVICE, SYSTEM AND METHOD FOR STEREOSCOPIC DISPLAY

(71) Applicant: BOE TECHNOLOGY GROUP CO., LTD., Beijing (CN)

(72) Inventor: Wei Wei, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/945,059

(22) Filed: Apr. 4, 2018

(65) Prior Publication Data

US 2019/0020868 A1    Jan. 17, 2019

(30) Foreign Application Priority Data

Jul. 11, 2017 (CN) .......................... 2017 1 0561959

(51) Int. Cl.
| | |
|---|---|
| *H04N 13/337* | (2018.01) |
| *G02B 27/26* | (2006.01) |
| *H04N 13/398* | (2018.01) |
| *G02B 27/01* | (2006.01) |
| *H04N 13/344* | (2018.01) |

(52) U.S. Cl.
CPC ....... *H04N 13/337* (2018.05); *G02B 27/0101* (2013.01); *G02B 27/26* (2013.01); *H04N 13/344* (2018.05); *H04N 13/398* (2018.05); *G02B 2027/0134* (2013.01); *H04N 2213/001* (2013.01)

(58) Field of Classification Search
CPC ................................................. G02B 27/0101
See application file for complete search history.

(56) References Cited

U.S. PATENT DOCUMENTS

2011/0267438 A1   11/2011  Yang et al.
2012/0033145 A1*   2/2012  Ko .................... H04N 13/337
                                              349/13
(Continued)

FOREIGN PATENT DOCUMENTS

CN       1038543 A      1/1990
CN     102308587 A      1/2012
(Continued)

OTHER PUBLICATIONS

First Office Action for Chinese Application No. 201710561959.6, dated Feb. 2, 2019, 8 Pages.

*Primary Examiner* — Rebecca A Volentine
(74) *Attorney, Agent, or Firm* — Brooks Kushman P.C.

(57) ABSTRACT

A device for stereoscopic display includes: a first display source for providing a first eye image; a first optical element on a light path of an emitted light ray of the first display source for reflecting the emitted light ray to enable the reflected light ray to reach a first position point; a second display source for providing a second eye image; and a second optical element on a light path of an emitted light ray of the second display source for reflecting the emitted light ray of the second display source to enable the reflected light ray to reach the first position point. Virtual images of the first eye image viewed at the first position point and the second eye image viewed at the first position point coincide, and the first eye image and the second eye image are a left eye image and a right eye image, respectively.

18 Claims, 6 Drawing Sheets

(56) References Cited

U.S. PATENT DOCUMENTS

| | | | |
|---|---|---|---|
| 2013/0050593 A1* | 2/2013 | Fujikawa | G02B 27/0101 |
| | | | 349/9 |
| 2013/0182197 A1 | 7/2013 | Ludewig et al. | |
| 2015/0160458 A1 | 6/2015 | Uno | |
| 2016/0091715 A1* | 3/2016 | Larson | G02B 27/0101 |
| | | | 348/53 |
| 2017/0146803 A1* | 5/2017 | Kishigami | G02B 5/30 |
| 2017/0235138 A1* | 8/2017 | Morohashi | B60K 35/00 |
| | | | 359/631 |
| 2017/0336628 A1* | 11/2017 | Kim | G02B 5/30 |
| 2018/0074313 A1* | 3/2018 | Nambara | G02B 27/0101 |
| 2018/0124364 A1* | 5/2018 | Yata | G02B 27/0101 |
| 2018/0157036 A1* | 6/2018 | Choi | G02B 27/0101 |
| 2019/0004350 A1* | 1/2019 | Sahlsten | G02B 27/0101 |

FOREIGN PATENT DOCUMENTS

| | | |
|---|---|---|
| CN | 103003736 A | 3/2013 |
| CN | 104395128 A | 3/2015 |
| CN | 104570350 A | 4/2015 |
| JP | 2004168230 A | 6/2004 |

* cited by examiner

DEVICE, SYSTEM AND METHOD FOR STEREOSCOPIC DISPLAY

CROSS-REFERENCE TO RELATED APPLICATION

This application claims priority to Chinese Patent Application No. 201710561959.6 filed on Jul. 11, 2017, which is incorporated herein by reference in its entirety.

TECHNICAL FIELD

The present disclosure relates to the field of display technologies, in particular to a device, a system and a method for stereoscopic display.

BACKGROUND

A device for stereoscopic display is proposed in the related art, which may display information stereoscopically. However, the device for stereoscopic display in the related art has a poor stereoscopic image quality. For example, the stereoscopic effect of a display image is poor.

SUMMARY

In a first aspect, the present disclosure provides a device for stereoscopic display. The device includes:

a first display source, configured to provide a first eye image;

a first optical element, located on a light path of an emitted light ray of the first display source, and configured to reflect the emitted light ray of the first display source to enable the reflected light ray to reach a first position point;

a second display source, configured to provide a second eye image; and a second optical element, located on a light path of an emitted light ray of the second display source, and configured to reflect the emitted light ray of the second display source to enable the reflected light ray to reach the first position point;

where a virtual image of the first eye image viewed at the first position point coincides with a virtual image of the second eye image viewed at the first position point, the first eye image is one of a left eye image and a right eye image, and the second eye image is the other one of the left eye image and the right eye image.

Optionally, a light-exiting surface of the first display source is parallel to a light-exiting surface of the second display source, a reflective surface of the first optical element is parallel to a reflective surface of the second optical element, a vertical distance between the light-exiting surface of the first display source and the light-exiting surface of the second display source is equal to a horizontal distance between the reflective surface of the first optical element and the reflective surface of the second optical element, the emitted light ray of the first display source is reflected by the first optical element, and the reflected light ray from the first optical element is transmitted through the second optical element and reaches the first position point.

Optionally, a brightness of the emitted light ray of the first display source is larger than a brightness of the emitted light ray of the second display source.

Optionally, the brightness of the emitted light ray of the first display source is 20 percent larger than the brightness of the emitted light ray of the second display source.

Optionally, the first optical element is one of a transflective film, a transflective plate, a reflective film and a reflective plate, and the second optical element is one of the transflective film and the transflective plate.

Optionally, each of the emitted light ray of the first display source and the emitted light ray of the second display source is polarized light, and a polarization direction of the emitted light ray of the first display source is perpendicular to a polarization direction of the emitted light ray of the second display source; or each of the emitted light ray of the first display source and the emitted light ray of the second display source is polarized light, the polarization direction of the emitted light ray of the first display source is identical to the polarization direction of the emitted light ray of the second display source, and the device for stereoscopic display further includes a quarter phase retardation film on the reflective surface of the first optical element or on the reflective surface of the second optical element.

Optionally, each of the emitted light ray of the first display source and the emitted light ray of the second display source is natural light, and the device for stereoscopic display further includes:

a first polarizer on the light-exiting surface of the first display source and a second polarizer on the light-exiting surface of the second display source, where a transmission axis of the first polarizer is perpendicular to a transmission axis of the second polarizer; or a first polarizer on the light-exiting surface of the first display source and a second polarizer on the reflective surface of the second optical element, and a transmission axis of the first polarizer is perpendicular to a transmission axis of the second polarizer; or a first polarizer on the reflective surface of the first optical element and a second polarizer on the light-exiting surface of the second display source, and a transmission axis of the first polarizer is perpendicular to a transmission axis of the second polarizer; or a first polarizer on the reflective surface of the first optical element and a second polarizer on the reflective surface of the second optical element, and a transmission axis of the first polarizer is perpendicular to a transmission axis of the second polarizer.

Optionally, an angle between the polarization direction of the emitted light ray of the first display source when reaching at the first position point and a horizontal plane is 45°, and an angle between the polarization direction of the emitted light ray of the second display source when reaching at the first position point and the horizontal plane is 135°.

Optionally, each of the reflective surface of the first optical element and the reflective surface of the second optical element is a flat surface or a curve surface.

Optionally, each of the first display source and the second display source is one of a liquid crystal display panel, a digital light processing display device and a liquid crystal on silicon display device.

In a second aspect, the present disclosure further provides a system for stereoscopic display, which includes the above device for stereoscopic display and a pair of polarization eyeglasses. A polarization direction of one of two lens of the polarization eyeglasses is identical to a polarization direction of the emitted light ray of the first display source of the device for stereoscopic display when reaching at the first position point, and a polarization direction of the other one of the two lens of the polarization eyeglasses is identical to a polarization direction of the emitted light ray of the second display source of the device for stereoscopic display when reaching at the first position point.

Optionally, the system for stereoscopic display is a stereoscopic head-up vehicle-mounted display system.

In a third aspect, the present disclosure further provides a stereoscopic display method, which is applied to the above device for stereoscopic display. The method includes:

controlling a first display source to provide a first eye image; and controlling a second display source to provide a second eye image, where the first eye image is one of a left eye image and a right eye image, and the second eye image is the other one of the left eye image and the right eye image.

Optionally, the controlling the first display source to provide the first eye image and controlling the second display source to provide the second eye image includes: controlling a brightness of an emitted light ray of the first display source to be larger than a brightness of an emitted light ray of the second display source.

Optionally, the controlling the first display source to provide the first eye image; and controlling the second display source to provide the second eye image further includes: controlling the brightness of the emitted light ray of the first display source to be 20 percent larger than the brightness of the emitted light ray of the second display source.

DETAILED DESCRIPTION

To make technical problems to be solved, technical solutions and advantages of embodiments of the present disclosure clearer, the specific embodiments will be described in detail hereinafter in conjunction with drawings.

Figure 1:
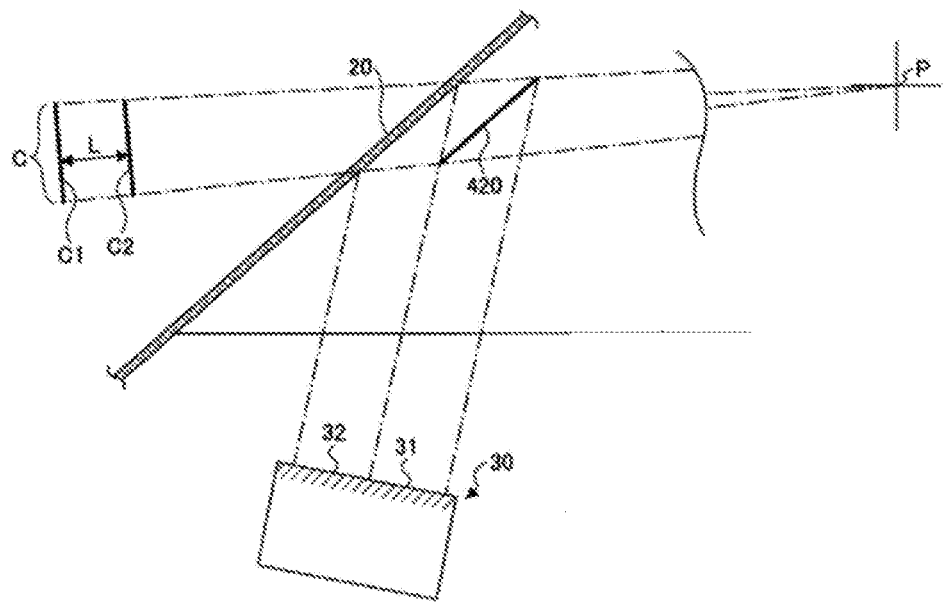
FIG. 1 is a schematic diagram of a device for stereoscopic display in the related art.

FIG. 1 is a schematic diagram of a device for stereoscopic display in the related art. As shown in FIG. 1, the device for stereoscopic display in the related art includes a first combiner 20, a second combiner 420 and a light projector 30. The light projector 30 includes a first light projecting unit 31 and a second light projecting unit 32. The first light projecting unit 31 generates display light that transmits to the second combiner 420. The second light projecting unit 32 generates display light that transmits to the first combiner 20. The first combiner 20 and the second combiner 420 are arranged in such a manner that a virtual image C1 of the first combiner 20 and a virtual image C2 of the second combiner 420 overlap to form a stereoscopic display image C. However, as shown in FIG. 1, the two images C1 and C2 share the light projecting component 30, which results in a poor stereoscopic effect of the display image. In addition, the C1 needs to be transmitted through the second combiner 420 before entering into human eyes, which causes a brightness to be greatly attenuated, thereby resulting in a poor stereoscopic image quality.

In order to solve a problem of the poor stereoscopic image quality of the device for stereoscopic display in the related art, embodiments of the present disclosure provide a device, a system and a method for stereoscopic display, which makes a stereoscopic display effect better.

A device for stereoscopic display is provided according to embodiments of the present disclosure. The device includes:

a first display source, configured to provide a first eye image;

a first optical element, located on a light path of an emitted light ray of the first display source, and configured to reflect the emitted light ray of the first display source to enable the reflected light ray to reach a first position point;

a second display source, configured to provide a second eye image; and a second optical element, located on a light path of an emitted light ray of the second display source, and configured to reflect the emitted light ray of the second display source to enable the reflected light ray to reach the first position point;

where a virtual image of the first eye image viewed at the first position point coincides with a virtual image of the second eye image viewed at the first position point, the first eye image is one of a left eye image and a right eye image, and the second eye image is the other one of the left eye image and the right eye image.

In the embodiments, the first display source provides the first eye image, and the virtual image of the first eye image is formed through the first optical element, the second display source provides the second eye image, the virtual image of the second eye image is formed through the second optical element, the virtual image of the first eye image and the virtual image of the second eye image coincide to display a stereoscopic image, and the first eye image and the second eye image are provided by different display sources, which makes the stereoscopic display effect better.

Figure 2:
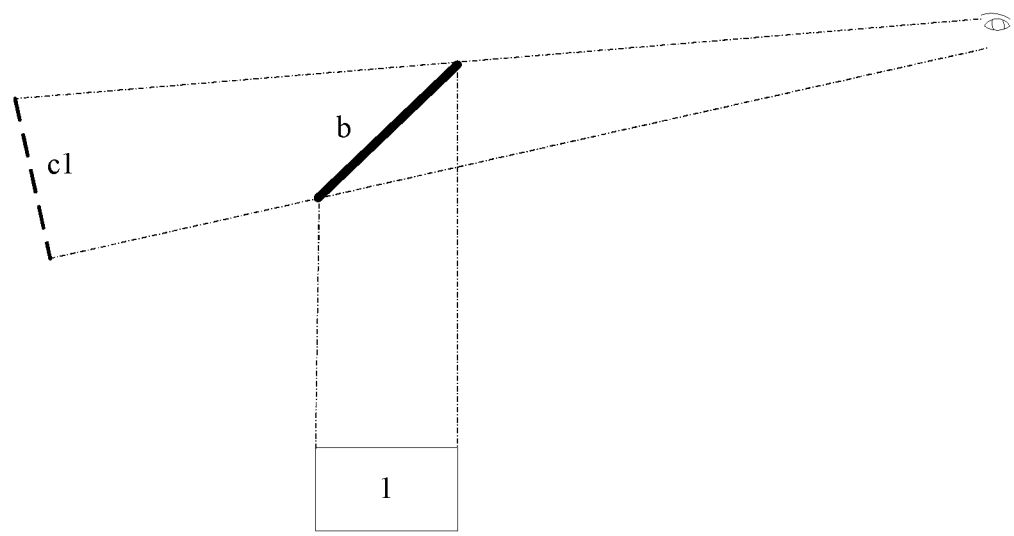
FIG. 2 is a schematic diagram of a light path of an emitted light ray of a first display source according to embodiments of the present disclosure.
Figure 3:
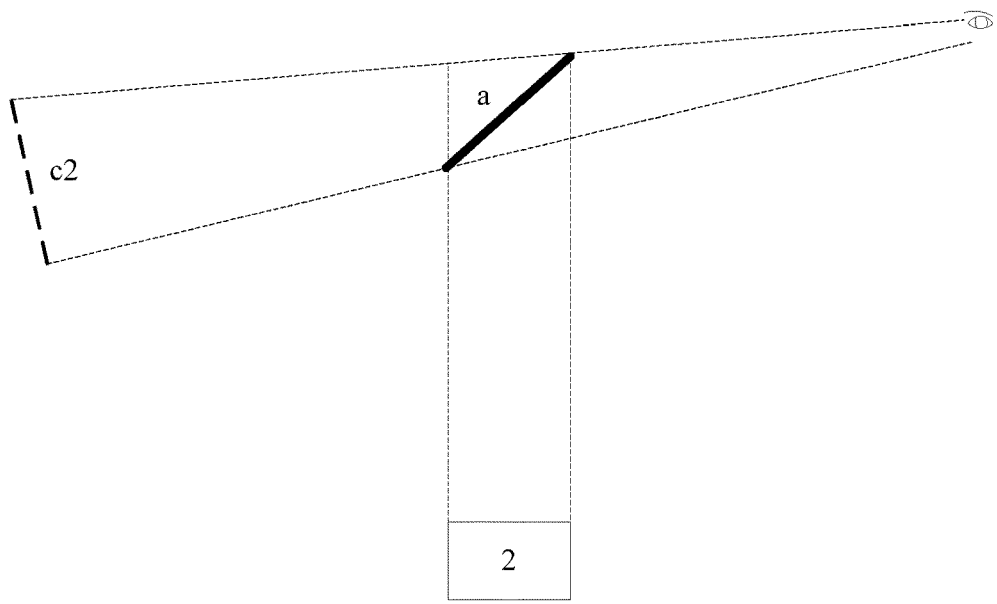
FIG. 3 is a schematic diagram of a light path of an emitted light ray of a second display source according to embodiments of the present disclosure.

Specifically, as shown in FIG. 2, the first optical element b is located on the light path of the emitted light ray of the first display source 1, the emitted light ray of the first display source 1 is reflected by the first optical element b and reaches at a preset position point, and the virtual image c1 is formed after the first eye image provided by the first display source 1 is transmitted through the first optical element b. As shown in FIG. 3, the second optical element a is located on the light path of the emitted light ray of the second display source 2, the emitted light ray of the second display source 2 is reflected by the second optical element a and reaches at the preset position point, and the virtual image c2 is formed after the second eye image provided by the second display source 2 is transmitted through the second optical element a.

Figure 4:
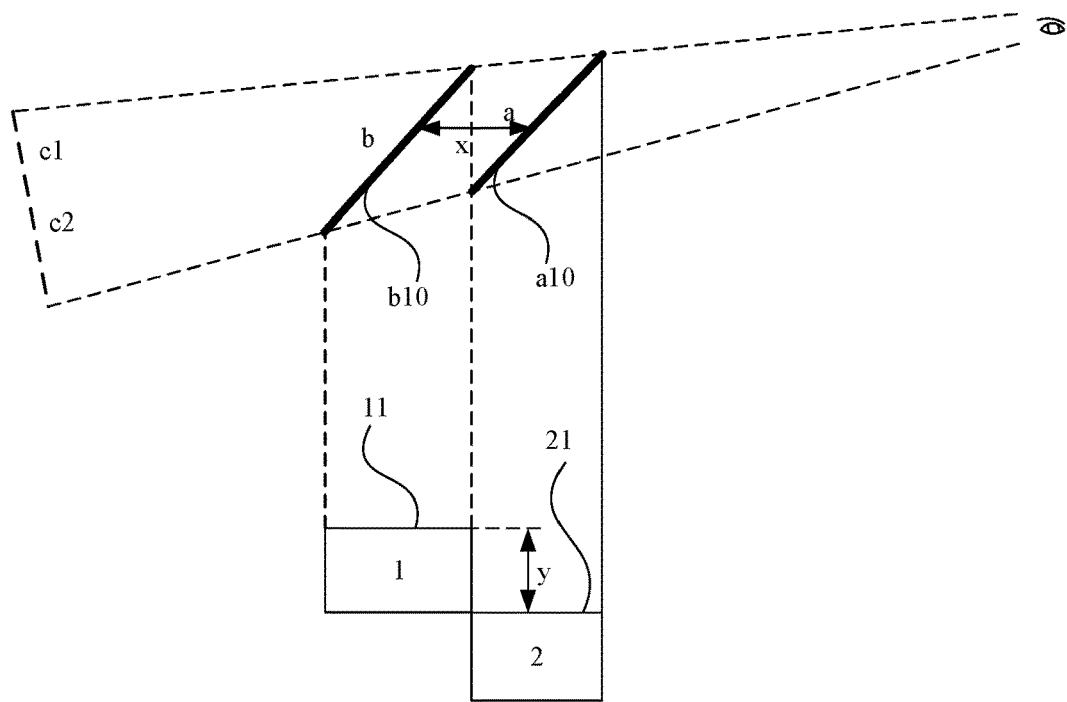
FIG. 4 is a schematic diagram of a device for stereoscopic display according to embodiments of the present disclosure.

As shown in FIG. 4, the device for stereoscopic display in the embodiments includes a first display source 1, a second display source 2, a first optical element b and a second optical element a. A light-exiting surface 11 of the first display source 1 is parallel to a light-exiting surface 21 of the second display source 2. A reflective surface b10 of the first optical element b is parallel to a reflective surface a10 of the second optical element 2. A vertical distance y between the light-exiting surface 11 of the first display source 1 and the light-exiting surface 21 of the second display source 2 is equal to a horizontal distance x between the reflective surface b10 of the first optical element b and the reflective surface a10 of the second optical element a. In such a manner, the virtual images c1 and c2 coincides, and a stereoscopic image may be viewed at a preset position point. An emitted light ray of the first display source 1 is reflected by the first optical element b, and the reflected light ray from the first optical element b is transmitted through the second optical element a and reaches the preset position point, that is, the second optical element a is located on the light path of the reflected light ray of the first optical element b.

Since the emitted light ray of the first display source 1 is reflected by the first optical element b, and before reaching at the preset position point, the reflected light ray from the first optical element b needs to be transmitted through the second optical element a, the second optical element a needs to be transparent. Since a loss occurs when the reflected light ray from the first optical element b is transmitted through the second optical element a, in order to ensure the display quality of a stereoscopic image, in the embodiments, a brightness of the emitted light ray of the first display source 1 is designed to be larger than a brightness of the emitted light ray of the second display source 2. In such a manner, a brightness of the reflected light ray from the first optical element b after reaching the preset position point may be ensured, and thereby improving the quality of the stereoscopic image.

The loss when the reflected light ray from the first optical element b is transmitted through the second optical element a is generally about 20%, and thus in the embodiments, it may be designed that the brightness of the emitted light ray of the first display source 1 is 20 percent larger than the brightness of the emitted light ray of the second display source 2.

Each of the first display source 1 and the second display source 2 may be a liquid crystal display panel, a DLP (Digital Light Processing) display device, or an LCOS (Liquid Crystal on Silicon) display device. Optionally, the first display source 1 and the second display source 2 may also be other types of display devices, as long as a display image can be provided.

The first optical element b may be a transflective film, a transflective plate, a reflective film, or a reflective plate. In a specific embodiment as shown in FIG. 4, since the reflected light ray from the first optical element b further needs to be transmitted through the second optical element a, the second optical element a needs to be capable of transmitting light, in addition to reflecting light, and the second optical element a may be a transflective film or a transflective plate. Each of the reflective surfaces of the first optical element b and the second optical element a may be a flat surface or a curve surface (as indicated by a dotted line in FIG. 10), as long as the light can be reflected by the surfaces.

The light rays reaching at the preset position point need to be two polarized lights whose polarization directions are perpendicular to each other, such that a stereoscopic image may be viewed with a pair of polarized eyeglasses at the preset position. The above two polarized light rays are the light ray which is emitted by the first display source 1, reflected by the first optical element b and reaches at the preset position point, and the light ray which is emitted by the second display source 2, reflected by the second optical element a and reaches at the preset position point.

In an embodiment, each of the emitted light of the first display source 1 and the second display source 2 is polarized light, and the polarization directions of the two light rays when reaching at the preset position point are perpendicular to each other. Specific implementations include but are not limited to the following manners, including a first manner and a second manner.

In the first manner, each of the emitted light rays of the first display source 1 and the second display source 2 is polarized light, and a polarization direction of the emitted light ray of the first display source 1 is perpendicular to a polarization direction of the emitted light ray of the second display source 2.

Figure 5:
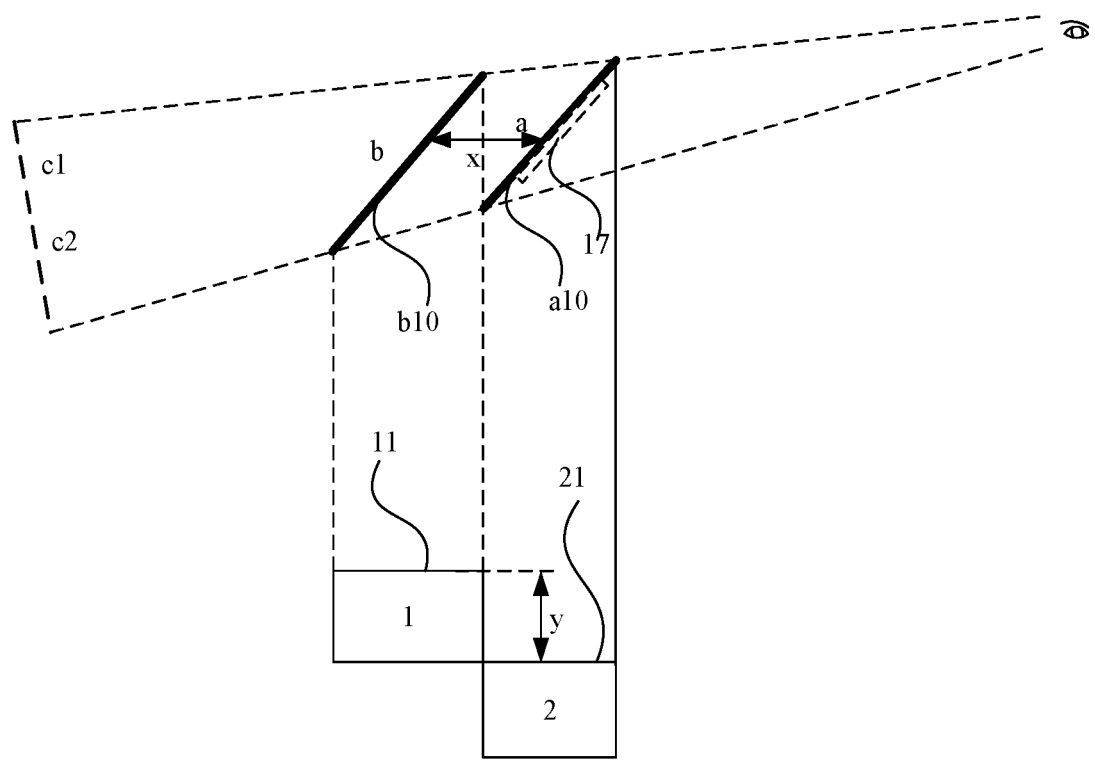
FIG. 5 is a schematic diagram of a device for stereoscopic display according to some other embodiments of the present disclosure.

In the second manner, each of the emitted light rays of the first display source 1 and the second display source 2 is polarized light, and the polarization direction of the emitted light ray of the first display source 1 is identical to the polarization direction of the emitted light ray of the second display source 2. In such a manner, as shown in FIG. 5, the device for stereoscopic display further includes a quarter phase retardation film on the reflective surface of the first optical element b or on the reflective surface of the second optical element a, which enables the polarization directions of the two light rays when reaching at the preset position point to be perpendicular.

In another embodiment, each of the emitted light rays of the first display source 1 and the second display source 2 is natural light, and the polarization directions of the two light rays when reaching at the preset position point are perpendicular. Specific implementations include but are not limited to the following manners, including a first manner, a second manner, a third manner and a fourth manner.

Figure 6:
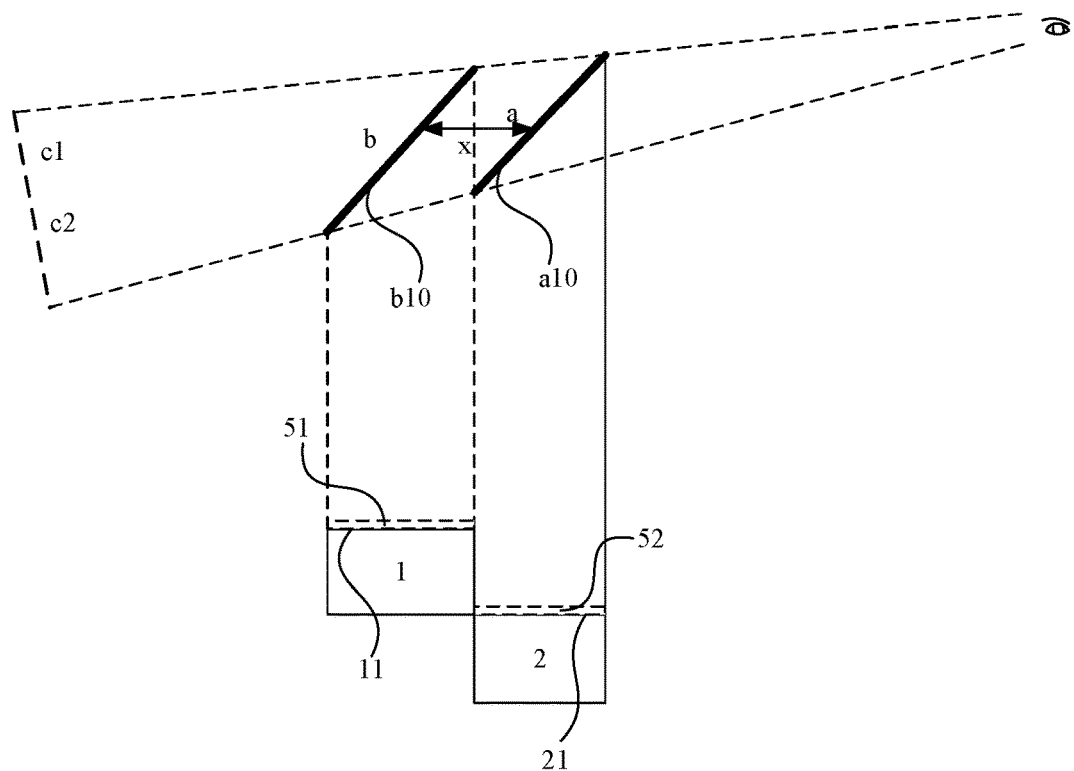
FIG. 6 is a schematic diagram of a device for stereoscopic display according to some other embodiments of the present disclosure.

In the first manner, each of the emitted light rays of the first display source 1 and the second display source 2 is natural light. As shown in FIG. 6, the device for stereoscopic display further includes: a first polarizer 51 on a light-exiting surface of the first display source 1 and a second polarizer 52 on a light-exiting surface of the second display source 2, a transmission axis of the first polarizer is perpendicular to a transmission axis of the second polarizer, and the natural light emitted by the first display source 1 and the second display source 2 are converted into polarized light through the first polarizer and the second polarizer.

Figure 7:
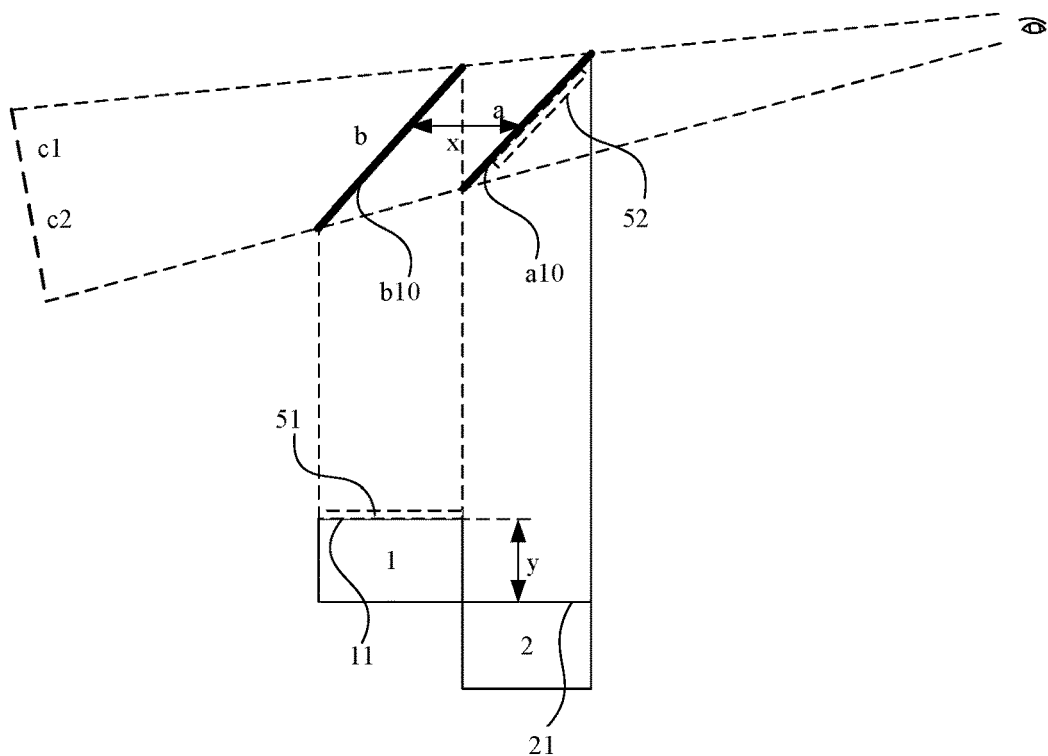
FIG. 7 is a schematic diagram of a device for stereoscopic display according to some other embodiments of the present disclosure.

In the second manner, each of the emitted light rays of the first display source 1 and the second display source 2 is natural light. As shown in FIG. 7, the device for stereoscopic display further includes: a first polarizer 51 on a light-exiting surface of the first display source 1 and a second polarizer 52 on a reflective surface of the second optical element a, a transmission axis of the first polarizer is perpendicular to a transmission axis of the second polarizer, and the natural light emitted by the first display source 1 and the second display source 2 are converted into polarized light through the first polarizer and the second polarizer.

Figure 8:
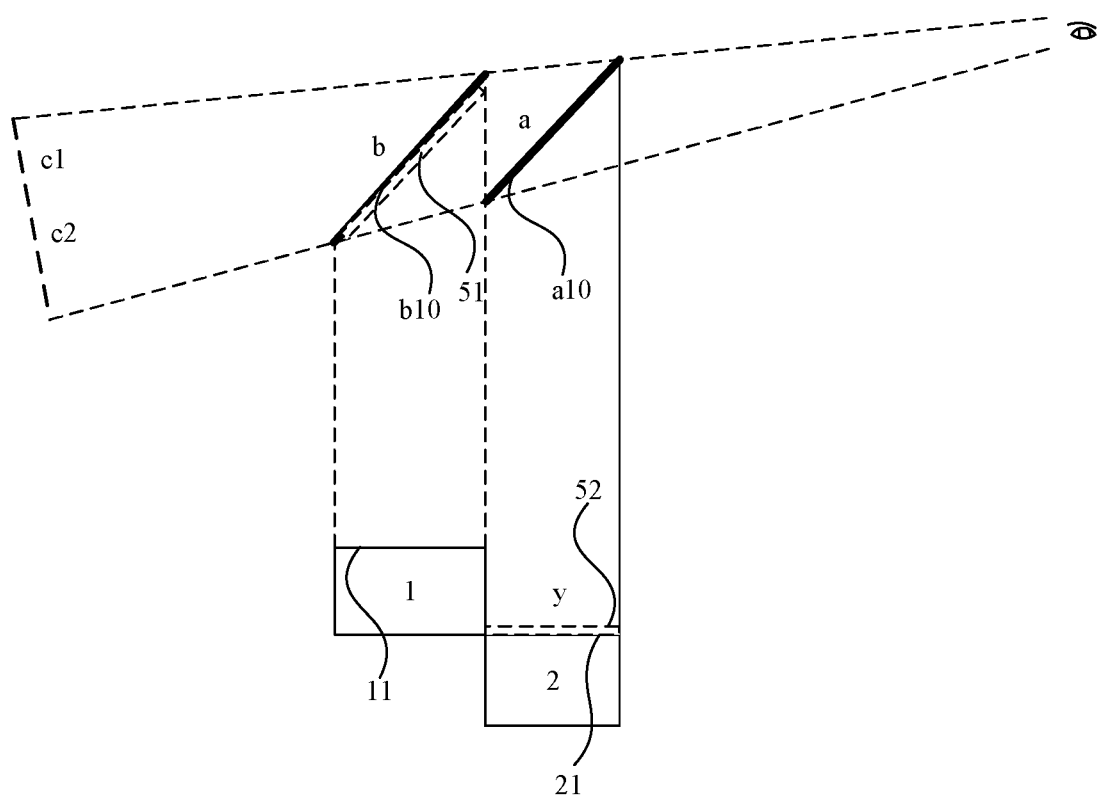
FIG. 8 is a schematic diagram of a device for stereoscopic display according to some other embodiments of the present disclosure.

In the third manner, each of the emitted light rays of the first display source 1 and the second display source 2 is natural light. As shown in FIG. 8, the device for stereoscopic display further includes: a first polarizer 51 on a reflective surface of the first optical element b and a second polarizer 52 on a light-exiting surface of the second display source 2, a transmission axis of the first polarizer is perpendicular to a transmission axis of the second polarizer, and the natural light emitted by the first display source 1 and the second display source 2 are converted into polarized light through the first polarizer and the second polarizer.

Figure 9:
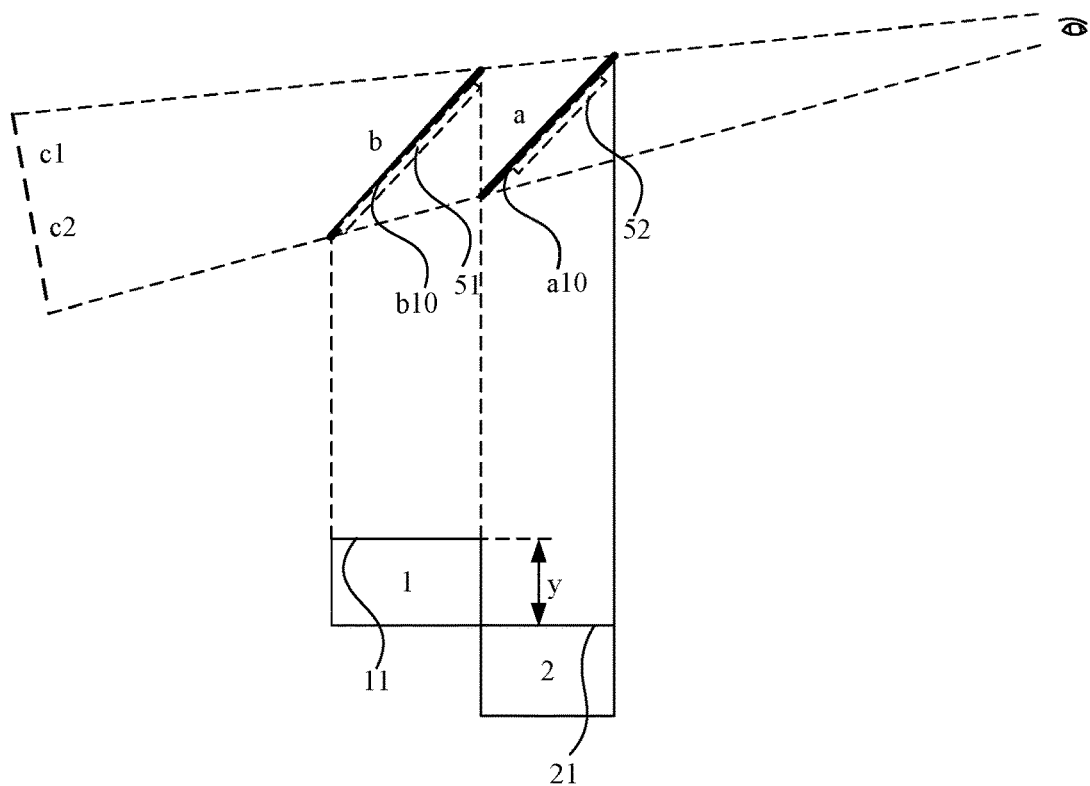
FIG. 9 is a schematic diagram of a device for stereoscopic display according to some other embodiments of the present disclosure.

In the fourth manner, each of the emitted light rays of the first display source 1 and the second display source 2 is natural light. As shown in FIG. 9, the device for stereoscopic display further includes: a first polarizer 51 on a reflective surface of the first optical element b and a second polarizer 52 on a reflective surface of the second optical element a, a transmission axis of the first polarizer is perpendicular to a transmission axis of the second polarizer, and the natural light emitted by the first display source 1 and the second display source 2 are converted into polarized light through the first polarizer and the second polarizer.

In an optional embodiment, an angle between the polarization direction of the emitted light ray of the first display source 1 when reaching at the first position point and a horizontal plane is 45°, and an angle between the polarization direction of the emitted light ray of the second display source when reaching at the first position point and the horizontal plane is 135°.

Figure 10:
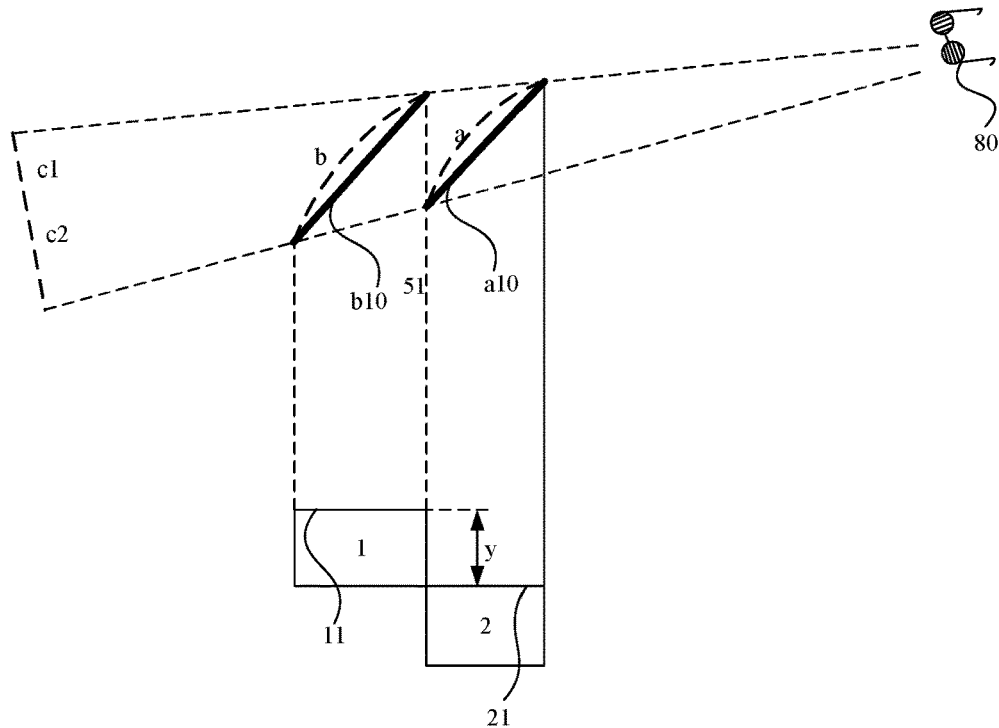
FIG. 10 is a schematic diagram of a device for stereoscopic display according to some other embodiments of the present disclosure.

Optionally, embodiments of the present disclosure further provide a system for stereoscopic display, which includes the above device for stereoscopic display. As shown in FIG. 10, the system further includes a pair of polarization eyeglasses 80. A polarization direction of one of two lens of the polarization eyeglasses is identical to a polarization direction of the emitted light ray of the first display source of the device for stereoscopic display when reaching at the first position point, and a polarization direction of the other one of the two lens of the polarization eyeglasses is identical to a polarization direction of the emitted light ray of the second display source of the device for stereoscopic display when reaching at the first position point. In such a manner, one eye of a user may view the first eye image, and the other eye of the user may view the second eye image through the polarization eyeglasses, thereby viewing a stereoscopic image.

Optionally, the system for stereoscopic display is a stereoscopic vehicle-mounted head-up display system, which may be applied in a vehicle display. Vehicle display information may be projected on a front window of a vehicle through the system for stereoscopic display, and a driver does not need to look down at the vehicle display information. Optionally, the system for stereoscopic display may also be applied to other display environments.

Embodiments of the present disclosure further provide a method for stereoscopic display, applied to the above device for stereoscopic display. The method includes:

controlling a first display source to provide a first eye image; and controlling a second display source to provide a second eye image, where the first eye image is one of a left eye image and a right eye image, and the second eye image is the other one of the left eye image and the right eye image.

In the embodiments, the first display source provides the first eye image, and a virtual image of the first eye image is formed through the first optical element, the second display source provides the second eye image, a virtual image of the second eye image is formed through the second optical element, the virtual image of the first eye image and the virtual image of the second eye image coincide to display a stereoscopic image, and the first eye image and the second eye image are provided by different display sources, which makes the stereoscopic display effect better.

A light ray is emitted by the first display source and reflected by the first optical element, and the reflected light ray from the first optical element is transmitted through the second optical element. A loss when the reflected light ray the first optical element is transmitted through the second optical element is generally about 20%, and thus in display, it may be controlled that a brightness of the emitted light ray of the first display source is larger than a brightness of the emitted light ray of the second display source. Optionally, it may be controlled that the brightness of the emitted light ray of the first display source is 20 percent larger than the brightness of the emitted light ray of the second display source.

The device for stereoscopic display may be applied in a vehicle display. Vehicle display information may be projected on a front window of a vehicle through the device for stereoscopic display. Optionally, the device for stereoscopic display may also be applied to other display environments.

Unless otherwise defined, technical terms or scientific terms used in the present disclosure should be interpreted according to common meanings thereof as commonly understood by those of ordinary skills in the art. Such terms as "first", "second" and the like used in the present disclosure do not represent any order, quantity or importance, but are merely used to distinguish different components. Such terms as "including", "includes", "include", "comprise", "comprises" or "comprising" and the like mean that an element or an article preceding the term contains elements or items and equivalents thereof behind the term, but does not exclude other elements or items. Such terms as "connect", "connected" or "connecting" and the like are not limited to physical or mechanical connections, but may include electrical connections, whether direct connection or indirect connection. Such terms as "on", "under", "left", "right" and the like are only used to represent a relative position relationship, and when an absolute position of a described object is changed, the relative position relationship thereof may also be changed accordingly.

It may be understood that when an element such as a layer, a film, a region or a substrate is referred to as being "on" or "under" another element, the element may be "directly" "on" or "under" the another element, or there may exist an intervening element.

The above embodiments are merely optional embodiments of the present disclosure. It should be noted that numerous improvements and modifications may be made by those skilled in the art without departing from the principle of the present disclosure, and these improvements and modifications shall also fall within the scope of the present disclosure.

What is claimed is:

1. A device for stereoscopic display, comprising:
   a first display source, configured to provide a first eye image;
   a first optical element, located on a light path of an emitted light ray of the first display source, and configured to reflect the emitted light ray of the first display source to enable the reflected light ray to reach a first position point;
   a second display source, configured to provide a second eye image; and
   a second optical element, located on a light path of an emitted light ray of the second display source, and configured to reflect the emitted light ray of the second display source to enable the reflected light ray to reach the first position point;
   wherein a virtual image of the first eye image viewed at the first position point coincides with a virtual image of the second eye image viewed at the first position point, the first eye image is one of a left eye image and a right eye image, and the second eye image is the other one of the left eye image and the right eye image, wherein a light-exiting surface of the first display source is parallel to a light-exiting surface of the second display source, a reflective surface of the first optical element is parallel to a reflective surface of the second optical element, a vertical distance between the light-exiting surface of the first display source and the light-exiting surface of the second display source is equal to a horizontal distance between the reflective surface of the first optical element and the reflective surface of the second optical element, the emitted light ray of the first display source is reflected by the first optical element, and the reflected light ray from the first optical element is transmitted through the second optical element and reaches the first position point.

2. The device for stereoscopic display according to claim 1, wherein a brightness of the emitted light ray of the first display source is larger than a brightness of the emitted light ray of the second display source.

3. The device for stereoscopic display according to claim 2, wherein the brightness of the emitted light ray of the first display source is 20 percent larger than the brightness of the emitted light ray of the second display source.

4. The device for stereoscopic display according to claim 1, wherein the first optical element is one of a transflective film, a transflective plate, a reflective film and a reflective plate, and the second optical element is one of the transflective film and the transflective plate.

5. The device for stereoscopic display according to claim 1, wherein each of the emitted light ray of the first display source and the emitted light ray of the second display source is polarized light, and a polarization direction of the emitted light ray of the first display source is perpendicular to a polarization direction of the emitted light ray of the second display source.

6. The device for stereoscopic display according to claim 1, wherein each of the emitted light ray of the first display source and the emitted light ray of the second display source is polarized light, a polarization direction of the emitted light ray of the first display source is identical to a polarization direction of the emitted light ray of the second display source, and the device for stereoscopic display further comprises a quarter phase retardation film on a reflective surface of the first optical element or on a reflective surface of the second optical element.

7. The device for stereoscopic display according to claim 1, wherein each of the emitted light ray of the first display source and the emitted light ray of the second display source is natural light, and the device for stereoscopic display further comprises:

a first polarizer on a light-exiting surface of the first display source and a second polarizer on a light-exiting surface of the second display source, wherein a transmission axis of the first polarizer is perpendicular to a transmission axis of the second polarizer.

8. The device for stereoscopic display according to claim 1, wherein each of the emitted light ray of the first display source and the emitted light ray of the second display source is natural light, and the device for stereoscopic display further comprises:

a first polarizer on a light-exiting surface of the first display source and a second polarizer on a reflective surface of the second optical element, and a transmission axis of the first polarizer is perpendicular to a transmission axis of the second polarizer.

9. The device for stereoscopic display according to claim 1, wherein each of the emitted light ray of the first display source and the emitted light ray of the second display source is natural light, and the device for stereoscopic display further comprises:

a first polarizer on a reflective surface of the first optical element and a second polarizer on a light-exiting surface of the second display source, and a transmission axis of the first polarizer is perpendicular to a transmission axis of the second polarizer.

10. The device for stereoscopic display according to claim 1, wherein each of the emitted light ray of the first display source and the emitted light ray of the second display source is natural light, and the device for stereoscopic display further comprises:

a first polarizer on a reflective surface of the first optical element and a second polarizer on a reflective surface of the second optical element, and a transmission axis of the first polarizer is perpendicular to a transmission axis of the second polarizer.

11. The device for stereoscopic display according to claim 1, wherein an angle between a polarization direction of the emitted light ray of the first display source when reaching at the first position point and a horizontal plane is 45°, and an angle between a polarization direction of the emitted light ray of the second display source when reaching at the first position point and the horizontal plane is 135°.

12. The device for stereoscopic display according to claim 1, wherein each of a reflective surface of the first optical element and a reflective surface of the second optical element is a flat surface or a curve surface.

13. The device for stereoscopic display according to claim 1, wherein each of the first display source and the second display source is one of a liquid crystal display panel, a digital light processing display device and a liquid crystal on silicon display device.

14. A system for stereoscopic display, comprising: a pair of polarization eyeglasses and the device for stereoscopic display according to claim 1, wherein a polarization direction of one of two lens of the polarization eyeglasses is identical to a polarization direction of the emitted light ray of the first display source of the device for stereoscopic display when reaching at the first position point, and a polarization direction of the other one of the two lens of the polarization eyeglasses is identical to a polarization direction of the emitted light ray of the second display source of the device for stereoscopic display when reaching at the first position point.

15. The system for stereoscopic display according to claim 14, wherein the system for stereoscopic display is a stereoscopic vehicle-mounted head-up display system.

16. A method for stereoscopic display, applied to the device for stereoscopic display according to claim 1, comprising:

controlling a first display source to provide a first eye image; and controlling a second display source to provide a second eye image, wherein the first eye image is one of a left eye image and a right eye image, and the second eye image is the other one of the left eye image and the right eye image.

17. The method for stereoscopic display according to claim 16, wherein the controlling the first display source to provide the first eye image and controlling the second display source to provide the second eye image comprises:

controlling a brightness of an emitted light ray of the first display source to be larger than a brightness of an emitted light ray of the second display source.

18. The method for stereoscopic display according to claim 16, wherein the controlling the first display source to provide the first eye image; and controlling the second display source to provide the second eye image comprises:

controlling the brightness of the emitted light ray of the first display source to be 20 percent larger than the brightness of the emitted light ray of the second display source.

\* \* \* \* \*